Patented Oct. 29, 1935

2,019,055

UNITED STATES PATENT OFFICE 2,019,055

ART OF PREPARING GRANULATED RUBBER

Royce J. Noble, Malden, Mass., assignor to Heveatex Corporation, Melrose, Mass., a corporation of Massachusetts No Drawing. Application January 16, 1934, Serial No. 706,858

17 Claims. (Cl. 18—50)

This invention relates to the art of preparing granulated rubber, or rubber compounds, from aqueous rubber dispersions of the nature of rubber latex. Its general objective is the preparation of granulated rubber or rubber compounds that can advantageously enter into various manufactures.

It has been recognized for some time that the rubber content of rubber latex may be separated out of the aqueous serum or vehicle in the form of flocs by adding suitable coagulating or flocculating agents to the latex while it is at appropriate dilution and/or contains extraneous hydrophilic stabilizers. It might offhand be reasoned that granulated rubber could be realized by merely drying the flocculated rubber, but such practice leads to a continuous rubber mass that can be disintegrated only into comparatively coarse rubber particles or crumbs if one aims to preserve the desirable characteristics of the rubber. While it is possible to produce a granulated rubber by adding to rubber latex a large amount, say 20% or more, of water-soluble hydrophilic stabilizer, based on the solids content of the latex, and then putting the latex through a spray-drying operation, nevertheless, such practice is undesirable for the reason that the resulting dry granulated rubber is impaired for many uses on account of the presence therein of such a large amount of water-soluble diluent.

In accordance with the present invention, I flocculate rubber latex or equivalent aqueous rubber dispersion in the presence of a limited amount of suitable hydrophilic colloid and then separate the rubber flocs from the aqueous vehicle, but, rather than dewatering the flocs to completion, I arrest the dewatering operation, which is preferably done in a filter press, centrifuge, or other mechanical extractor, at a stage when a mass of flocs having a water content ranging from about 25% to 45% has been produced. I have found that a mass of rubber flocs at such moisture content is of a sufficiently firm yet crumbly nature to lend itself to shearing, shredding, tearing, or similar comminuting action and that such action can readily subdivide or comminute the mass into granulated rubber of a particle size finer than about 30 mesh, which can be brought to substantially complete dryness while retaining its granulated state.

It is to be emphasized that the degree of fineness of the powder obtained is not merely a function of the comminuting step to which I subject the mass. The size of the flocs as formed will range between 50 and 200 microns, i. e. 1/500 and 1/125 inches; and, except for such further agglomeration as may result from drying and other mechanical treatment, this is also the range of particle size in the wet powder resulting from the comminuting step. The comminuting step is merely to break the loose bond between flocs, thus enabling an approach approximating the theoretical limit of particle size as the limitations of the particular machine employed will permit.

While there are various hydrophilic stabilizers that may be added to the latex accordant with my invention, nevertheless, I prefer to use one that can be insolubilized or destroyed by the addition of an appropriate coagulating or flocculating agent to the latex. For instance, glue may serve as a latex-stabilizer and formaldehyde as a coagulating or flocculating agent that insolubilizes the glue and destroys its stabilizing power. Soluble caseinates, albuminates, soaps, etc., may similarly serve as latex-stabilizers and various heavy metal salts as coagulating or flocculating agents that undergo metathetical reaction with such stabilizers to form insoluble compounds, viz., heavy metal caseinates, albuminates, soaps, etc.

One phase of my invention relates to the use of salts of those heavy metals, like zinc, that are capable of forming complex radicals with ammonia, for the purpose of insolubilizing alkali caseinates, albuminates, soaps, etc. constituting the latex stabilizers. In such case, after the flocculated rubber has been converted to a granular state by the practice of my invention, the granulated rubber is amenable to reversion to water-dispersed condition by mere treatment with ammonia water, as the ammonia solubilizes such heavy metal caseinates, albuminates, soaps, etc., by forming an ammonia complex with the heavy metal, e. g., a zinc-ammonia complex, and thereby promotes a dispersion of rubber in the aqueous medium. Evidently the soluble heavy metal ammonia complex is generated as a stabilizer about the original rubber particles flocculated from the latex and so induces an individualization of these particles in the stabilizing aqueous medium. I have found, however, that the granulated rubber is most amenable to reversion or redispersion when it is kept moist, that is, when it is not at any time dried to completion. Once the granulated rubber has been brought to a substantially dry condition, it is difficult to cause the desired reversion in ammonia water, probably by reason of the sharply reduced reactivity of the dried insoluble heavy metal compound toward the ammonia. It is preferable to keep the granulated rubber at a moisture content of at least about 20 to 30% when its redispersion in water is to be effected, as at such moisture content the mere mixing of ammonia water therewith is attended by the regeneration of an aqueous rubber dispersion of a particle size in the order of fineness of the rubber particles in the original rubber latex. In any case, however, the granulated rubber is substantially free from extraneous water-soluble material and cannot be reversed or redispersed by mere mixing with plain water. Some coagulating or flocculating agents that are not salts of heavy metals capable of forming complex radicals with ammonia lead to granulated rubber irreversible in the presence of even ammonia water, so that, when such agents are used, the granulated rubber is preferably always brought to a substantially dry condition.

It has been found, however, that the ability to lend reversibility to granulated rubber is not limited to zinc-protein or similar combinations, but applies to protein salts generally. Thus, not only is the zinc-protein compound soluble in ammonia, but other metallic proteinates are equally so. For practical purposes, however, only such metallic proteinates as are insoluble in plain water should be produced in the granulated rubber.

A specific procedure, which should, however, be considered as merely illustrative of the application of the principles of my invention, may be practiced substantially as follows. To about 250 pounds of ammonia-preserved latex of about 40% solids content is added with stirring about 60 pounds of a 10% casein solution. The casein solution may be prepared by swelling dry casein in water, dissolving it with strong ammonia water under heat to form ammonium caseinate, and diluting with water to 10% casein strength.

The latex-caseinate mixture is preferably, though not necessarily, diluted with water so that its rubber content is less than 20%, as such practice tends to produce a smaller particle size in the resulting granulated rubber. To the mixture of latex and ammonium caseinate is then added with stirring a solution prepared by dissolving about 5 pounds of zinc chloride and about an ounce more or less of acetic acid in about 200 to 500 pounds of water. As the zinc chloride solution is being added, the mixture thickens and is finally completely flocculated. The flocculated rubber has a pH value of about 8.2. The slurry of rubber flocs is filter-pressed until a cake of about 60% to 70% solids content is reached. The cake is characterized by its crumbliness and tends to fall apart into a powder upon merely being rubbed between the fingers. Were it desired, however, it would lose this tendency and become nothing more than a mass of rubber. Upon removal of the cake from the press, it is preferably dusted with talc, zinc stearate, or other suitable powder in the amount of preferably only about 1 to 2%. The powder facilitates the comminution of the cake into particles or granules of the desired fineness and inhibits cohesion of the particles during handling, drying, and afterwards, so they are possessed of a free-flowing quality. The dusted cake is subjected to comminuting action in a suitable machine, for instance, in an Abbe rotary cutter, which is equipped at its outlet with a screen permitting discharge from the machine of only rubber particles or granules of the desired fineness, for instance, particles or granules of 20 to 50, or even finer mesh.

In the foregoing example, rather than adding to the rubber latex a soluble caseinate as the insolubilizable hydrophilic stabilizer, I may add such others as the soluble albuminates, soaps, glue, etc., in appropriate amount. In any case, the amount of hydrophilic stabilizer employed is preferably less than about 7%, based on the solids content of the latex, as such a small amount, particularly when transformed to insolubilized condition, does not significantly affect the characteristics of the rubber with which it is associated. Various soluble salts of magnesium, calcium, zinc, aluminum, lead, etc., may be used as the flocculating agents for latex stabilized by the soluble caseinates, albuminates, soaps, etc. Examples of such salts are magnesium chloride, calcium chloride, calmium acetate, zinc chloride, zinc acetate, aluminum sulphate, lead chloride and lead acetate.

Preferred salts are those whose compounds with proteins, soap, etc., are most insoluble in water. Thus, for precipitating casein, calcium salts are less desirable than those of zinc, since only the mono-calcium caseinate is insoluble in water, while the di-calcium compound is soluble. While it is possible to use acids or acid salts as the flocculating agents, nevertheless, I consider them to be inferior for the purposes of the present invention, as the rubber flocs and the dry granulated rubber prepared therefrom have stronger cohesive tendency than when neutral salts are used. Indeed, I have found it highly desirable to control flocculation of the latex so that the pH value of the flocs is not less than about 7.

When flocculation of the rubber latex has been effected with zinc salts or the salts of other metals capable of forming an ammonia complex and a redispersion of the resultant granulated rubber is to be effected, the granulated rubber is preferably kept undried as in hermetically sealed containers or in a suitably humidified atmosphere so that it may be able to undergo redispersion by mere contact with ammonia water. The various practices of the present invention can be carried out to best economical advantage at rubber plantations where latex is accumulated and brought to a central depot, since this does away with the transportation of water in those instances where substantially dry granulated rubber is being produced and reduces greatly the amount of water to be transported in those instances where reversible granulated rubber is being produced.

The substantially dry granulated rubber of the present invention is valuable in making a wide variety of articles. To this end, it not only lends itself to ready compounding with the usual rubber-compounding ingredients, but also to ready combination or mixture with fibrous and granular materials of all sorts. For instance, the granulated rubber may be molded under heat and pressure into various rubber articles, in which connection it may be preliminarily compounded with vulcanizing ingredients such as sulphur, zinc oxide, and accelerators of vulcanization, and with fillers, pigments, etc. It may also be molded into erasers, sponge rubbers, and similar soft or porous rubber articles. By virtue of the fine particle size of the granulated rubber, the compounding operation need be merely effecting a physical homogeneous mixture of such rubber with the compounding ingredients, as by tumbling in a drum or by stirring in a container. It is thus seen that such compounding can be performed quickly in the simplest kind of apparatus and with low power consumption as against the prolonged mastication and high power requirements entailed in compounding the ordinary continuous rubber masses of commerce on the usual heavy rubber mills. Such materials as powdered natural or synthetic resins, gums, waxes, asphalts, etc., may also be readily commingled in any desired amount with the granulated rubber prior to molding under heat and pressure. In this latter way, one may arrive at thermoplastic compositions, that is, mixtures which may be softened markedly, or even melted under the application of moderate heat, for instance, temperatures ranging from 180° F. to 259° F. Cellulose fiber, such as wood pulp and cotton, asbestos or other mineral fiber, wool and other animal fiber, granulated cork, wood flour, etc. may be mixed with the granulated and, if desired, compounded rubber in the manufacture of molded or sheeted products. Abrasive granules such as emery, carborundum, etc., when mixed with the granulated compounded rubber, can be molded into abrasive wheels or similar abrasive tools. The granulated rubber can also be applied under suitable pressure to the surface of rubber and other articles to impart so-called matt finishes thereto. The granulated rubber can be quickly dissolved in rubber solvents, such as benzol, to produce rubber cements. The granulated rubber can also be incorporated into water-slushed, paper-making stock in the beater engine and the mixture formed on a paper-making machine into sheet material which, after suitable calendering, is serviceable as artificial leather, gasket material, flooring, etc. The foregoing are simply illustrative of the many uses to which the dry granulated rubber may be put.

The reversible granulated rubber can also be used in any of the foregoing ways. It has the additional highly valuable attribute that it need only be treated with ammonia water to be converted into a water-dispersed or liquid binder which, when dried, forms a continuous mass. For instance, after it has been mixed with fibers or other materials and the mixture formed into sheets, all that one need do to effect the desired bonding of the fibers or other materials with rubber is to treat the sheets with ammonia water and then dry them. It is, of course, possible to treat the reversible granulated rubber with ammonia water to put it in water-dispersed condition before mixing with rubber-compounding ingredients, fiber, or the various other materials mentioned.

Rather than compounding the granulated rubber, it is possible to compound the rubber latex from which the granulated rubber is derived. In other words, vulcanizing ingredients, fillers, pigments, etc., may be compounded with the rubber latex before it is flocculated so that the resulting granulated rubber will be in suitably compounded condition.

Such materials as montan wax, gilsonite, or other hard waxes, resins, bitumens, or the like, which do not markedly enhance the cohesiveness of the partially de-watered or filter-pressed rubber flocs may also be added to the latex before it is flocculated. These materials may be added either in pulverulent or water-dispersed condition. In using the term "rubber latex" in the appended claims, therefore, I mean not only latex containing the solids naturally associated therewith but latices which have been compounded in any of the foregoing ways. By the term "rubber latex" as used in the appended claims, I also mean to include artificial aqueous rubber dispersions of a nature akin to natural rubber latex.

I wish to dwell in further detail upon the importantly advantageous qualities possessed by granulated rubber prepared in accordance with my invention. As already indicated, such granulated rubber is free-flowing in dry condition and its manufacture can be controlled so that its size is finer than about 20 mesh. Indeed, the comminuting action to which the partially dried or filter-pressed mass of flocs is subjected may be such as to comport with a particle or granule size in the finished product falling within the range of about 50 to 100 or even finer mesh. Such granulated rubber is substantially free from water-soluble ingredients which, if present in substantial amount, detract from the utility of the rubber. In order to ensure perfect freedom of the finished product from water-soluble ingredients, the mass of rubber flocs may be washed before or during filter-pressing or other water-extracting operation designed to bring the mass to the moisture content at which comminution or granulation can be satisfactorily performed. The insolubilized stabilizer which appears in the granulated rubber does not, as already indicated, impair its utility. It is, however, preferable to keep the insolubilized stabilizer content of the granulated rubber down as low as possible, say about 7%, based on the weight of dry rubber, as the upper limit.

The amount of insolubilized stabilizer in the finished product is only about 0.4% greater than the amount of stabilizer employed in the case of zinc caseinate, wherein the zinc content is 0.36%. The amount of insolubilized stabilizer formed from a given amount of soluble stabilizer would, of course, depend upon the particular flocculating agent used.

I claim:—

1. A process of preparing granulated rubber from rubber latex which comprises adding an insolubilizable hydrophilic stabilizer to the latex, flocculating the latex with an agent that insolubilizes the stabilizer, separating the mass of rubber flocs from the latex water, dewatering the wet mass only until it becomes a firm but crumbly cake, and granulating the firm, moist and crumbly cake.

2. A process of preparing granulated rubber from rubber latex which comprises adding an insolubilizable hydrophilic stabilizer to the latex, flocculating the latex with an agent that insolubilizes the stabilizer, separating the mass of rubber flocs from the latex water, dewatering the wet mass only to a stage where it becomes a firm but crumbly cake, granulating the firm, moist and crumbly cake, and drying the granulated rubber.

3. A process of preparing from rubber latex granulated rubber redispersible in ammonia water, which comprises adding to the latex a hydrophilic stabilizer that can be insolubilized by the salt of a metal capable of combining with ammonia to form an ammonia complex, flocculating the latex with such salt so as to insolubilize such stabilizer, separating the mass of rubber flocs from the latex water, dewatering the wet mass only to a stage where it becomes a firm but crumbly cake, and granulating the firm, moist and crumbly cake to produce a granulated rubber re-dispersible in ammonia water.

4. A process of preparing granulated rubber from rubber latex which comprises adding an insolubilizable hydrophilic stabilizer to the latex, flocculating the latex with an agent that insolubilizes the stabilizer, separating the mass of rubber flocs from the latex water, dewatering the wet mass under pressure to produce a cake of a water content of about 25% to 45%, and granulating the cake.

5. A process of preparing granulated rubber from rubber latex which comprises adding an insolubilizable hydrophilic stabilizer to the latex, flocculating the latex with an agent that insolubilizes the stabilizer, separating the mass of rubber flocs from the latex water, dewatering the wet mass under pressure to produce a cake of a water content of about 25% to 45%, granulating the cake, and drying the granulated rubber.

6. A process of preparing granulated rubber from rubber latex which comprises adding an insolubilizable hydrophilic stabilizer to the latex, flocculating the latex with an agent that insolubilizes the stabilizer under conditions to yield rubber flocs of a pH value no less than about 7, dewatering the wet mass under pressure to produce a cake of a water content of about 25% to 45% and granulating the cake.

7. A process of preparing granulated rubber from rubber latex which comprises adding an insolubilizable hydrophilic stabilizer to the latex, flocculating the latex with an agent that insolubilizes the stabilizer, separating the mass of rubber flocs from the latex water, dewatering the wet mass under pressure to produce a cake of a water content of about 25% to 45%, and granulating the cake in the presence of a small amount of water-insoluble powder.

8. A process of preparing granulated rubber from rubber latex which comprises adding an insolubilizable hydrophilic stabilizer to the latex, flocculating the latex with an agent that insolubilizes the stabilizer, separating the mass of rubber flocs from the latex water, washing the mass substantially free from water-soluble constituents, dewatering the wet mass only to a stage where it becomes a firm but crumbly cake, and granulating the firm, moist and crumbly cake in the presence of a small amount of water-insoluble powder.

9. Substantially dry, free-flowing, granulated rubber of a particle size finer than about 20 mesh and possessing substantially the characteristics of coagulated, latex-derived rubber, including substantial freedom from water-soluble ingredients, but containing water-insolubilized added hydrophilic colloid distributed substantially uniformly therethrough.

10. A latex-derived, substantially dry, granulated rubber redispersible by the mere mixing of ammonia water therewith but substantially free from water-soluble ingredients, said rubber being of a particle size finer than about 20 mesh and containing distributed therethroughout a water-insolubilized latex-stabilizer whose positive radical is a metal capable of forming an ammonia complex.

11. A latex-derived, substantially dry, granulated rubber redispersible by the mere mixing of ammonia water therewith but substantially free from water-soluble ingredients, said rubber being of a particle size finer than about 20 mesh and containing distributed therethroughout a water-insolubilized latex-stabilizer whose positive radical is zinc.

12. A process of preparing granulated rubber from rubber latex which comprises developing in the latex water rubber flocs enveloped by the insoluble reaction product of added insolubilizable hydrophilic stabilizer and an added agent that insolubilizes the stabilizer, separating the rubber flocs as a mass from the latex water, dewatering the wet mass only to a stage where it becomes a firm but crumbly cake, and granulating the firm, moist, and crumbly cake.

13. A process of preparing granulated rubber from rubber latex which comprises developing in the latex water rubber flocs enveloped by the insoluble reaction product of added insolubilizable hydrophilic stabilizer and an added agent that insolubilizes the stabilizer, separating the rubber flocs as a mass from the latex water, dewatering the wet mass only to a stage where it becomes a firm but crumbly cake, granulating the firm, moist and crumbly cake, and drying the granulated rubber.

14. A process of preparing granulated rubber from rubber latex which comprises developing in the latex water rubber flocs enveloped by the insoluble reaction product of added insolubilizable hydrophilic stabilizer and an added agent that insolubilizes the stabilizer, separating the rubber flocs as a mass from the latex water, dewatering the wet mass only to a stage where it becomes a firm but crumbly cake, and granulating the firm, moist and crumbly cake in the presence of a small amount of water-insoluble powder.

15. Substantially dry, free-flowing, granulated rubber of a particle size finer than about 20 mesh and possessing substantially the characteristics of coagulated, latex-derived rubber, including substantial freedom from water-soluble ingredients, but containing water-insolubilized added hydrophilic colloid distributed substantially uniformly therethrough in amount not more than about 7%, based on the dry weight of rubber.

16. Substantially dry, free-flowing granulated rubber of a particle size finer than about 20 mesh and possessing substantially the characteristics of coagulated, latex-derived rubber, including substantial freedom from water-soluble ingredients, but containing water-insolubilized added hydrophilic colloid distributed substantially uniformly therethrough as material at least part of which envelops said granulated rubber particles.

17. Substantially dry, free-flowing granulated rubber of a particle size finer than about 20 mesh and possessing substantially the characteristics of coagulated, latex-derived rubber, including substantial freedom from water-soluble ingredients, but containing water-insolubilized added hydrophilic colloid distributed substantially uniformly therethrough in amount not more than about 7%, based on the dry weight of rubber, as material at least part of which envelops said granulated rubber particles.

ROYCE J. NOBLE.